Patented Oct. 19, 1937

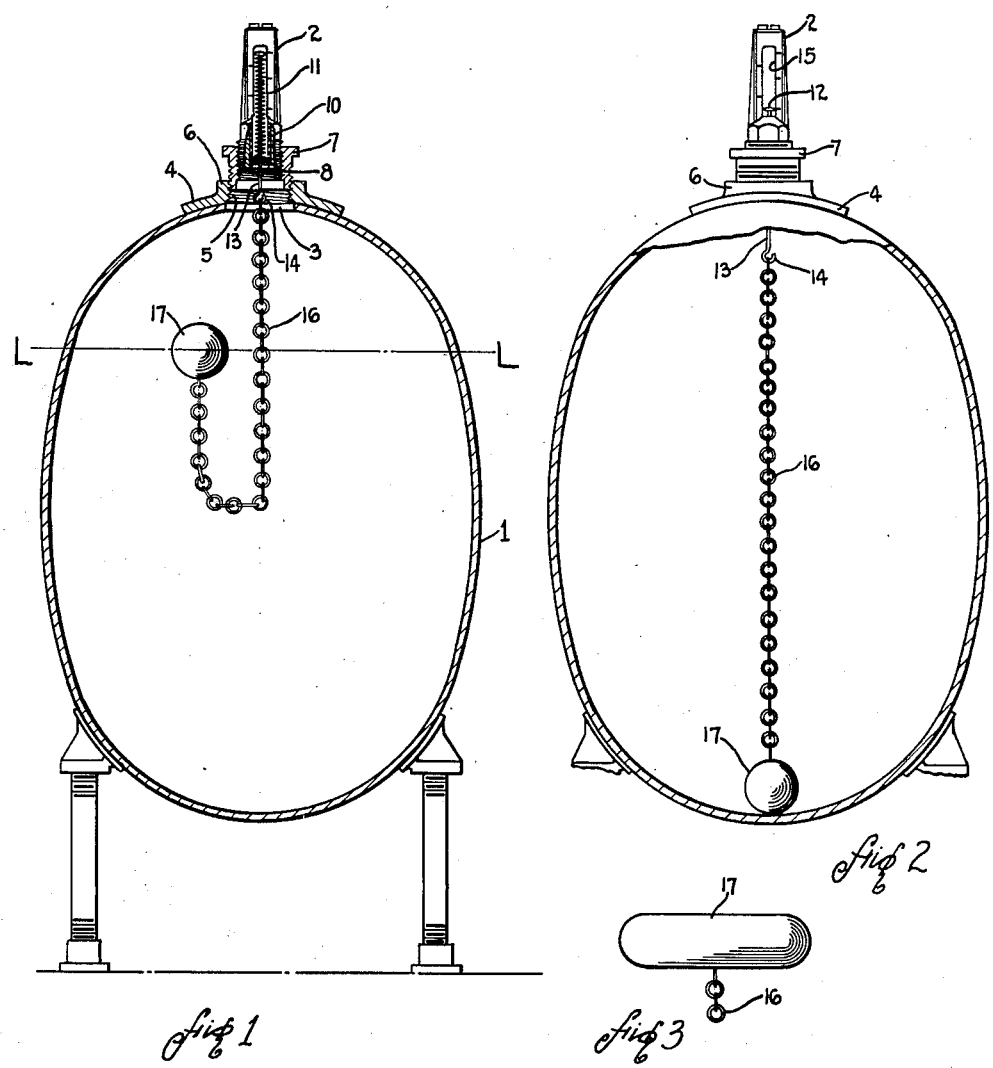

2,096,411

UNITED STATES PATENT OFFICE 2,096,411

GAUGE

Harry M. St. John and Thomas Rynalski, Detroit, Mich., assignors to Detroit Lubricator Company, Detroit, Mich., a corporation of Michigan Application December 14, 1935, Serial No. 54,445

7 Claims. (Cl. 73—82)

Our invention relates generally to gauges for indicating the quantity of liquid in a container and more particularly to the operating means therefor.

One of the objects of our invention is to provide a new and improved gauge for indicating the quantity of liquid in a container.

Another object of our invention is to provide a gauge of the above mentioned character which is efficient in operation and yet economical to manufacture.

The invention consists in the improved construction and combination of parts to be more fully described hereinafter and the novelty of which will be particularly pointed out and distinctly claimed.

In the accompanying drawing, to be taken as a part of this specification, we have fully and clearly illustrated our invention, in which drawing—

Figure 1 is a view in vertical central cross section of a liquid container having our improved gauge associated therewith;

Fig. 2 is a view similar to Fig. 1 showing the position of the indicating and operating means of the gauge when the container is empty, and Fig. 3 is a view of a float which constitutes a part of our gauge.

Referring to the drawing by characters of reference, the numeral 1 designates a reservoir tank or container on the top outer wall of which is mounted the indicating mechanism of our gauge and which is housed within a housing 2. Any suitable type of indicating mechanism may be employed and mounted on the container in any suitable manner. The container 1 has a centrally located aperture 3 in its top wall and fixed to the outer wall of container 1, such as by welding, there is a reenforcing plate 4 having an aperture 5 which aligns with aperture 3 in the container 1. The aperture 5 in the plate 4 may be defined by an annular upturned flange 6 which may be internally threaded for receiving an externally threaded tubular member 7 which is also internally threaded for receiving a lower end portion of the housing 2. The lower end of housing 2 is open and has an internal, upwardly facing shoulder on which an abutment member 8 seats. The abutment member 8 may be held in position against its seat by engagement therewith of the lower end of a tubular, transparent member 10 which may be glass and which may be sleeve fitted into housing 2.

Disposed within housing 2 there is a calibrated coil spring 11 which has one end abutting the abutment member 8 and its other or upper end abutting the underside of an annular flange or head 12 formed on the upper end of a movable indicator or supporting member 13. The supporting member or indicator 13 is in the form of a rod which extends centrally through spring 11 and through an aperture in the abutment member 8 and has its lower end shaped in the form of a hook, as at 14. In this type of indicator the head 12 of rod 13 serves as the pointer and is visible through an opening 15 in the wall of housing 2 and through the glass tubular member 10 which surrounds rod 13 and spring 11. The wall of housing 2, adjacent the opening therein through which the indicator is visible, may be provided with suitable markings or indicia cooperable with the head 12 of rod 13 to indicate the quantity of liquid in container 1.

In order to provide for efficiently operating the indicating mechanism in accordance with changes in the quantity of liquid in the container, we provide a flexible and submergible weight, preferably a metallic chain 16 which acts to move rod 13 downwardly, and we provide a float 17 which acts to vary the effective weight of the chain acting on rod 13 in accordance with changes in the quantity of liquid in container 1. One end of the chain 16 may be connected to the lower or hooked end of rod 13 while the other end is connected to the float 17, and this chain is preferably constructed so that it will not kink and is preferably sufficiently long so that when the container is empty, as in Fig. 2, and the pointer or head 12 points to empty, the float will seat on the bottom wall of the container. The specific gravity of float 17 with respect to the specific gravity of the liquid in the container is such that it will float substantially at the surface of the liquid. In order to minimize the possibility of gauge errors occurring, due to changes in the buoyancy of the float upon variations in the specific gravity of the liquid, an elongated float, as shown in Fig. 3, or one which has a relatively large horizontal cross sectional area in proportion to its volume may be employed.

The operation of our gauge is as follows: When there is liquid in container 1, as indicated by the line L—L of Fig. 1, the chain 16 will have a loop portion which will be below the liquid level, or be submerged. Of the submerged looped portion of chain 16, substantially one half is supported by float 17 while the other half of the submerged portion, and the portion of the chain above the liquid level, is supported by the calibrated spring 11 via rod 13. The weight of substantially one half of the submerged portion of the chain, plus that portion above the liquid level, is the effective weight acting to compress spring 11 and is variable as the liquid level varies. It will be seen that as the level of the liquid decreases more of the weight of the chain will be supported by spring 11, and when the container becomes empty the entire weight of the chain will be acting to compress spring 11 so that as the float moves downward with the decreasing liquid level the pointer 12 will correspondingly move downward and indicate the quantity of liquid in the container.

What we claim and desire to secure by Letters Patent of the United States is:

1. In a device having a movable indicator for indicating the quantity of liquid in a container, a flexible and submergible weight member operatively connected to said movable indicator for operating the same, and a float in said container and connected to said flexible weight member, said float being operable to support a portion of the weight of said weight member with said supported portion being variable in accordance with changes in liquid level to correspondingly vary the effective weight acting on said movable indicator.

2. In a device having a movable indicator for indicating the quantity of liquid in a container, a float in said container, and a flexible weight member depending from said indicator for operating the same and having one end connected to said float, said float being floatable adjacent to the level of the liquid and operable to support a portion of the adjacent end of said flexible weight member with said portion being variable in accordance with changes in the quantity of liquid in the container to correspondingly vary the portion of the weight member depending from said indicator.

3. In a device having a movable indicator for indicating the quantity of liquid in a container, a submergible metallic chain operable by its weight to operate said indicator and having operative connection therewith, and a float in said container and attached to one end of said chain, said float being operable to support substantially one half of the submerged portion of said chain with the submerged portion being variable in length in accordance with changes in liquid level whereby the effective weight of the chain acting on said indicator is correspondingly varied.

4. In a device for indicating the quantity of liquid in a container, a flexible and submergible metallic chain extending into the liquid in the container, supporting means for one end of said chain, a float disposed in said container and adapted to float at a point in the liquid so that it supports a depending portion of the other end of said chain with the remainder of the chain being supported by said supporting means, the lengths of chain supported by said float and said supporting means varying as the level of the liquid varies, and indicator means associated with said supporting means and operable in response to variation in the length of said chain supported thereby for indicating the quantity of liquid in said container.

5. In a device for indicating the quantity of liquid in a container, a submergible metallic chain extending into said container, a resilient support for one end of said chain, a float disposed in the container and connected to the other end of said chain, said float being adapted to float substantially at the surface of the liquid and being operable upon variation of the level of liquid to vary the effective weight of the chain supported by said resilient supporting means, and indicator means associated with said resilient support and movable thereby for indicating the quantity of liquid in said container.

6. In a device for indicating the quantity of liquid in a container, an indicating means including a calibrated spring acting to move an indicator in one direction, a flexible and submergible metallic chain operable to exert a force opposing said spring to move said indicator in the opposite direction, said chain having one end operatively connected to said spring, a float in said container and connected to the other end of said chain, said chain having a submerged portion with the float being operable to support a portion of the weight of said submerged portion with the weight of the remaining portion of said chain acting against the force of said spring and being variable in accordance with changes in the quantity of liquid in the container to correspondingly move said indicator.

7. In a liquid level indicator, a metallic chain actuating member submergible in the liquid, an indicator secured to one end of the chain, said indicator being moved by the weight of said chain, means opposing movement of said indicator and balancing the weight of the chain acting on said indicator for each position of the indicator, and a single float connected to the other end of said chain and supporting a portion of and varying the weight of the chain acting on said indicator, said indicator moving proportionally to the weight of the chain supported by the float.

HARRY M. ST. JOHN.
THOMAS RYNALSKI.